United States Patent [19]

Inoue

[11] Patent Number: 4,513,783
[45] Date of Patent: Apr. 30, 1985

[54] DIRECTIONAL CONTROL VALVE

[76] Inventor: Yukinobu Inoue, 70, Aza-Atsuta, Ohaza-Kochino, Kounan-shi, Aichi-ken 483, Japan

[21] Appl. No.: 654,513

[22] Filed: Sep. 24, 1984

Related U.S. Application Data

[63] Continuation of Ser. No. 427,293, Sep. 29, 1982, abandoned, which is a continuation of Ser. No. 192,547, Sep. 30, 1980, abandoned.

[30] Foreign Application Priority Data

Oct. 1, 1979 [JP] Japan ................................ 54-126610

[51] Int. Cl.³ ........................................... F15B 13/043
[52] U.S. Cl. ............................ 137/625.68; 137/625.63; 137/625.64; 251/282
[58] Field of Search ...................... 137/625.25, 625.48, 137/625.63, 625.64, 625.66, 625.68; 251/174, 282

[56] References Cited

U.S. PATENT DOCUMENTS

| | | | |
|---|---|---|---|
| 2,394,487 | 2/1946 | Rotter et al. | 137/625.68 X |
| 2,601,990 | 7/1952 | Holzer | 137/625.64 |
| 2,669,417 | 2/1954 | Ray | 251/174 X |
| 2,732,860 | 1/1956 | Ray | 137/625.64 |
| 2,742,919 | 4/1956 | Ray | 251/137 X |
| 2,743,900 | 5/1956 | Holzer | 251/174 |
| 2,852,040 | 9/1958 | Deardorff | 137/625.21 |
| 2,858,851 | 11/1958 | Holl | 251/174 |
| 2,925,095 | 2/1960 | Bates | 251/174 X |
| 3,324,887 | 6/1967 | Mueller | 137/625.63 |
| 3,457,957 | 7/1969 | Mueller | 137/625.68 |
| 3,776,276 | 12/1973 | Stiltner | 251/174 X |

FOREIGN PATENT DOCUMENTS 1406635  9/1975  United Kingdom ........... 137/625.68

Primary Examiner—Gerald A. Michalsky
Attorney, Agent, or Firm—Armstrong, Nikaido, Marmelstein & Kubovcik

[57] ABSTRACT

Disclosed herein is a directional control valve used to control the interlocking, stop, acceleration, deceleration of an actuator and the acting direction thereof in hydraulic circuit. This directional control valve comprises slide valves of plate-type slidably inserted to a tank chamber within a casing; a pair or plural pairs of ports, each pair being opposed in symmetric arrangement on a slide valve cover located on the upper surface of the casing and a slide valve base located on the lower surface of the casing; and ring cups slidably fitted to port of respective ports by means of spring force of coil springs.

1 Claim, 2 Drawing Figures

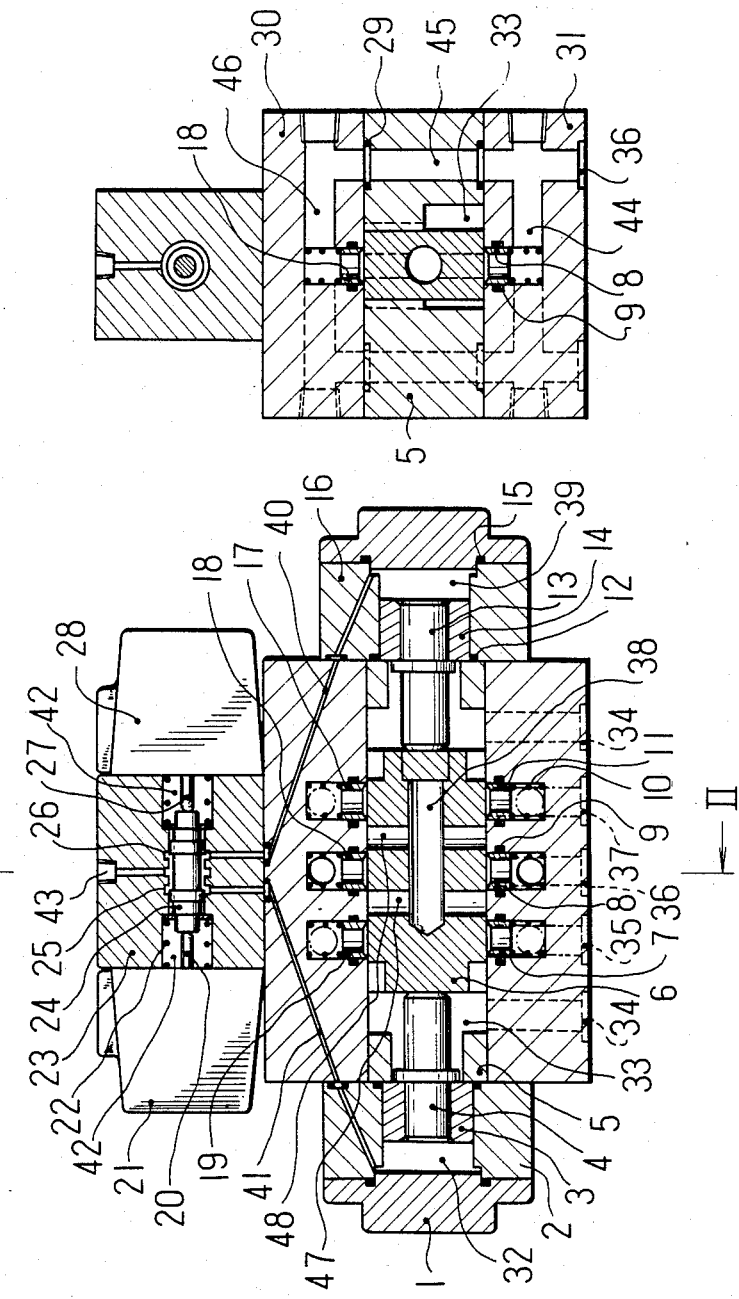

DIRECTIONAL CONTROL VALVE

This application is a continuation of application Ser. No. 427,293, filed Sept. 29, 1982, now abandoned, which is a continuation of application Ser. No. 192,547, filed Sept. 30, 1980, now abandoned.

BACKGROUND OF THE INVENTION (1) Field of the Invention

The present invention relates to directional control valve (hydraulic pressure changeover valve) used to control the interlocking, stop, acceleration, deceleration of an actuator and the acting direction thereof in hydraulic circuit.

(2) Description of the Prior Art

In usual, spool-type changeover valves have been used as a directional control valve in hydraulic circuit. However, there have several defects as hereinafter described.

First, a problem of internal leakage will be explained. In spool-type changeover valves a gap is provided between the spool land and the valve body to help the smooth sliding motion in the spool. Properties of the gap are determined usually under consideration of strain of the valve body caused by hydraulic pressure or tightening strength and variation of the gap length dependent on the temperature difference between the spool and the valve body at hot state also consideration of accuracy of machining. The sealing function in the sliding portion therefore has limitations and no effective means is found to prevent the leakage completely.

Next, a problem of shock produced during the changeover will be explained. In spool-type changeover valves, a defect of the construction i.e., large rate of variation of the path cross-section in comparison to action of the spool, causes very strong shock during the changeover, resulting in the apparatus damage.

In order to prevent the leakage, pilot check valves are arranged in required portions to help the function. In order to eliminate the shock also, pilot choke valves are used to decelerate the spool action and retard the changeover. However, these are not essential solutions of the problems.

A more troublesome problem is seizure of the spool. When oil including dust flows through the narrow gap between the spool land and the valve body on account of the internal leakage, the dust may fill the gap and pressure unbalance in the vertical direction transfer the spool land in one direction to obstruct the spool action. Balance grooves may be arranged on the spool land to eliminate the seizure, however, this remedy is of little effect.

Spool-type changeover valves have been used in spite of above mentioned problems. Accordingly, it is necessary to develop directional control valves with more safe, secure and economic properties.

SUMMARY OF THE INVENTION

An object of this invention is to provide a directional control valve which enables the elimination of leakage from the slide valve and the ring cup.

Another object of this invention is to provide a directional control valve which enables the reduction of strong shock during the changeover.

Another object of this invention is to provide a directional control valve wherein pressure balance applied to the valve body enables the smooth transferring of the body and the easy changeover action of hydraulic pressure.

In order to attain the above mentioned objects, a directional control valve according to this invention comprises plate-type slide valves each having a plurality of opposed changeover ports and slidably fitted to the casing of the valve body; one pair or plural pairs of ports, each pair being opposed in symmetric arrangement on the slide valve cover contacted with the upper surface of the casing and the slide valve base contacted with the lower surface of the casing to hold the pressure balance and increase the flow amount; and a plurality of ring cups changing respective changeover ports and acted by means of manual operation, electromagnetic force or fluid pressure in close contacting state with the slide valve using the spring force and hydraulic pressure.

Above mentioned and other objects and features of this invention will be apparent from following description in connection with accompanying drawings. However, drawings are for the purpose of explanation and do not restrict the scope of the invention.

BRIEF DESCRIPTION OF THE DRAWINGS

FIG. 1 is a sectional view of a directional control valve as an embodiment of this invention; and FIG. 2 is a sectional view along line II—II of FIG. 1.

DESCRIPTION OF THE PREFERRED EMBODIMENT

Constitution of an embodiment of this invention will be explained referring to the accompanying drawings.

A slide valve cover 30 and a slide valve base 31 with refined contact surfaces are contacted respectively with upper and lower surfaces of a casing 5 so as to constitute the exterior of the valve body. A slide valve 6 of cubic or plate type is slidably fitted to the center of the casing 5 so that upper and lower surfaces of the slide valve 6 slide with the contact surface of the slide valve cover 30 and the slide valve base 31 and both side surfaces thereof slide with inner side wall of the casing 5.

A solenoid valve controlling a master cylinder is mounted on the upper surface of the slide valve cover 30. The slide valve cover 30 is provided with paths for pilot oil pressure (paths 40 and 41) supplied from the solenoid valve (master valve) to a master cylinder (first cylinder 2 and second cylinder 16). Both paths are connected with the solenoid valve and master cylinder by means of gasket.

Three sets of ports are arranged respectively in opposition with respect to the slide valve 6 on the slide valve cover 30 and the slide valve base 31. The three sets of ports have respectively an A-port joint 35, a P-port joint 36 and a B-port joint 37. Also the ports have paths leading to respective joints, for example, a P-port first path 44, a P-port second path 46 and a P-port balance path 45 leading to the P-port joint 36. Port ring cups 19, 18, 17, 7, 8 and 11 are slidably fitted to corresponding ports, and a spring 10 is internally arranged for close contact of each cup with the sliding contact surface of the slide valve 6. The port ring cups 19, 18, 17, 7, 8 and 11 are of cylindrical shape and provided with smaller sliding contact surface on account of sealing effect. Each ring cup has an oil path on the inside and O-ring 9 for air tightness on the outside. The slide valve 6 is provided with communicating holes, i.e. a first changeover port 47 and a second changeover port 48, arranged in the same pitch as the ports on the cover 30 and the base 31 and having smaller contact surface than the inner diameter of each port ring cup, and also a pressure chamber 38. Notched portions are arranged on corners of both ends of the slide valve 6 so as to communicate with a tank chamber 33.

In the master cylinder to operate the slide valve 6, a first sleeve 3 and a second sleeve 14 are slidably fitted respectively to the inside of the first cylinder 2 and the second cylinder 16, and a cap 1 with O-ring 15 for keeping air tightness is attached to the casing 5 together with the first cylinder 2.

Function and effect of the embodiment will be explained in detail.

Excitation of a second solenoid 28 transfers a pilot spool 24 from the neutral position to the changeover position through a second solenoid pin 27. Pilot hydraulic pressure fed to a pilot hydraulic pressure joint 43 passes through the first cylinder path 41 and flows into a first cylinder chamber 32, acting on the first piston 4 and the first sleeve 3, thereby the slide valve 6 is moved towards the second cylinder 16 and stopped on the changeover position until demagnetization occurs.

Main operating oil enters the P-port joint 36 and separately flows through passage to the P-port first ring cup 8 and through passage of the P-port balance path 45, the P-port second path 46 and the P-port second ring cup 18. Main operating oil, flowing separately through the P-port first ring cup 8 and the P-port second ring cup 18, passes therethrough at the changeover position of the first changeover port 47 of the slide valve 6 on account of coincidence to the center of the first ring cup 8 and the second ring cup 18. Main operating oil then enters the pressure chamber 38 and flows through the second changeover port 48, the B-port first ring cup 11 and the B-port second ring cup 17 and, after joining again, into the B-port joint 37.

Hydraulic pressure in the A-port joint 35 passes through the A-port first ring cup 7, the A-port second ring cup 19, notched portion of the slide valve 6 and the tank chamber 33 and enters the tank port joint 34.

In the excitation of the first solenoid 21, the pilot oil pressure passes through the second passage 40, transferring the slide valve 6 towards the first cylinder 2, thereby main operating oil flows through the P-port joint 36 to the A-port joint 35 and the B-port joint 37 is communicated with the tank port joint 34.

When both first solenoid 21 and second solenoid 28 are demagnetized, the pilot spool 24 is transferred to the neutral position by means of the operation of the pilot spool spring 22, thereby the pilot hydraulic pressure is separated into the first cylinder path 41 and the second cylinder path 40, and the first sleeve 3 and the second sleeve 14 are moved respectively to cylinder end portions so as to keep the slide valve 6 in the neutral position.

The slide valve 6 slides in completely close contacting state by means of the main hydraulic pressure in the port ring cups 8, 18, 7, 19, 11 and 17 and the spring action of the spring 10, resulting in preventing the hydraulic pressure from leakage in the contact surface of the changeover state. Thereby the apparatus performs the leakless function.

In order to facilitate the operation of the slide valve 6, equal pressure is applied in vertical opposite positions of the slide valve 6 by arranging the first ring cup 8 and the second cup 18, the A-port first ring cup 7 and the second cup 19, and the B-port first ring cup 11 and the second cup 17 in symmetry, so that complete pressure balance is held.

In this embodiment, the pair of ports opposed with each other lead respectively to ends of branched paths. While the slide valve 6 is being moved, even if the first changeover port leads to the port ring cups 7 and 19 or the second changeover port to the port ring cups 11 and 17 through a narrow passage therefor, oil pressure is decreased by orifice effect. The oil pressure decreases to similar degree at both ports in the pair and thus a balanced thrust acts on the slide valve 6 as it is easily operated.

Furthermore, since gap between the slide valve 6 and the slide valve cover or the slide valve base is quite small, internal oil leakage during changeover operation is quite small. Accordingly, the control valve in this embodiment can be changed in safety even when it is connected to an oil hydraulic apparatus carrying load.

Although the electromagnetic valve is used as driving means of the slide valve in the above mentioned embodiment, fluid pressure or manual operation may be used.

Accordingly, the present invention enables the complete elimination of the internal leakage and the smooth changeover action without producing shock therefore provides ideal and economic effects.

What is claimed is:

1. A multiple-way, linear reciprocating valve comprising:

a casing having a tank chamber;

a plate-type slide valve member slidably inserted in the tank chamber with a small clearance therebetween and having a single internal pressure chamber bore inside the valve member, and notches on opposite ends of said member;

a slide valve member cover located on the upper surface of the casing;

a slide valve member base located on the lower surface of the casing, the slide valve member cover and base being spaced apart a distance which closely approximates the width of the valve member so that the valve member slides therein with a close tolerance;

three pairs of ring cups in the cover and the base aligned with each other and having biasing means consisting of coil springs biasing the ring cups towards the slide valve member;

only two pairs of upper and lower change-over ports in the slide valve member aligned with each other for selectively connecting the ring cups via the single internal pressure chamber bore inside the slide valve member, said two pairs of change-over ports communicating with each other through the single internal pressure chamber bore;

said slide valve member casing, cover and base forming at least one balance path between respective pairs of ring cups by communication therebetween;

port joints for respective ring cups for separately communicating with respective ones of the ring cups through the balance path and through the internal pressure chamber bore at a change-over position on account of the sliding of the slide valve member to cause a coincidence of respective ones of said change-over ports and ring cups; and separate tank ports connected to opposite ends of said tank chamber, said notches in said opposite ends of said slide valve member serving to ensure drainage through said tank ports or port joints not coinciding with change-over ports.

* * * * *